Figure 8:
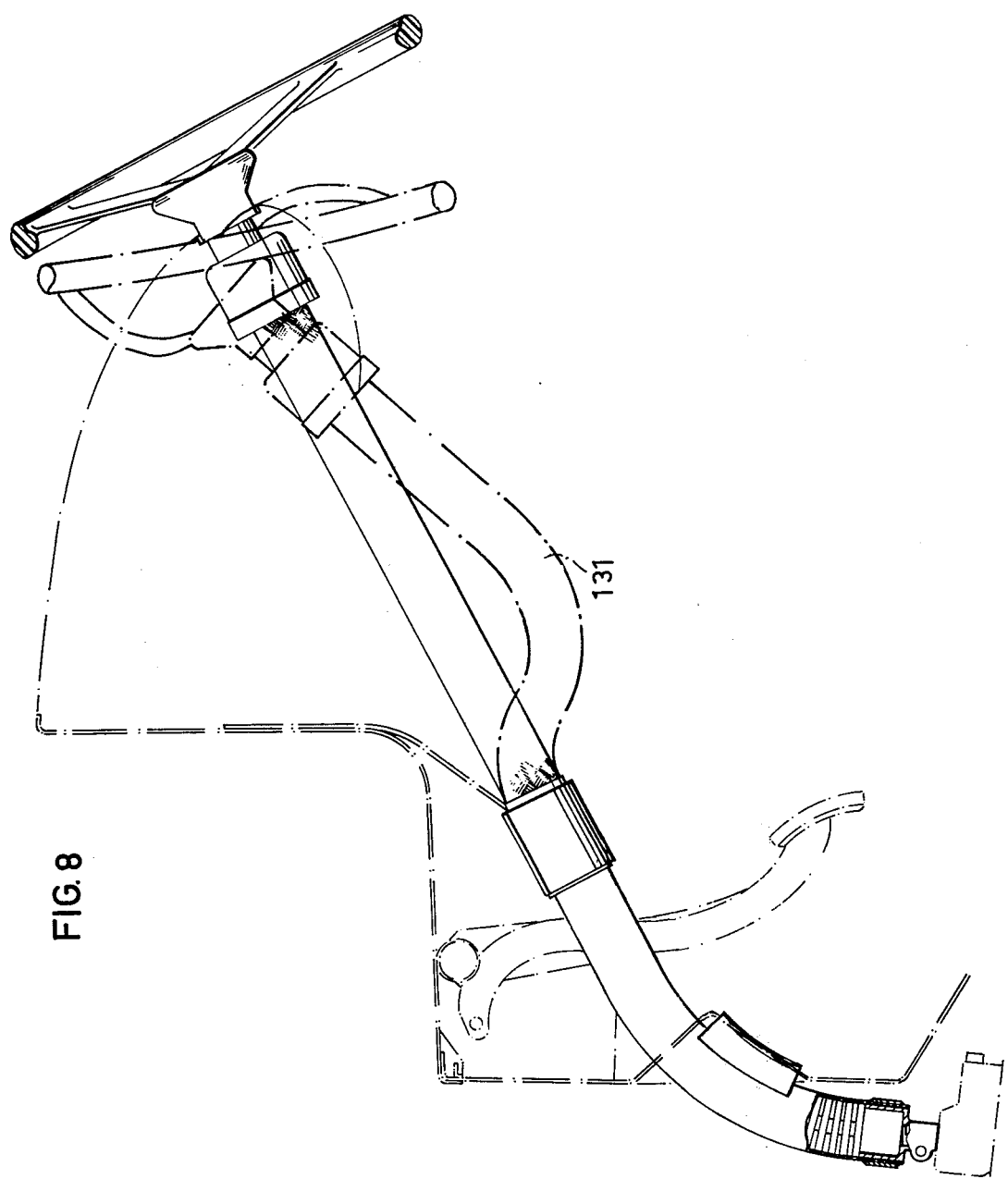

United States Patent [19]

Härdmark et al.

[11] 3,940,945
[45] Mar. 2, 1976

[54] FLEXIBLE SHAFT

[75] Inventors: Ragnar Malcus Härdmark; Hans Folke Georg Kornbrink, both of Linkoping, Sweden

[73] Assignee: Saab-Scania Aktiebolag, Sodertalje, Sweden

[22] Filed: Nov. 26, 1973

[21] Appl. No.: 419,099

[30] Foreign Application Priority Data
Nov. 27, 1973 Sweden............................. 15438/72
Nov. 27, 1973 Sweden............................. 15439/73

[52] U.S. Cl......................... 64/2 R; 64/1 S; 64/11 B
[51] Int. Cl.²............................................ F16C 1/02
[58] Field of Search ............ 64/2 R, 2 P, 3, 4, 11 B, 64/1 S; 74/501

[56] References Cited
UNITED STATES PATENTS

| | | | |
|---|---|---|---|
| 326,941 | 9/1885 | Browne | 64/2 R |
| 1,510,157 | 9/1924 | Pemberton | 64/2 R |
| 2,592,055 | 4/1952 | Monahan | 64/2 P |
| 2,603,073 | 7/1952 | Nield | 64/2 P |
| 3,260,069 | 7/1966 | Neilson et al. | 64/2 R |
| 3,399,584 | 9/1968 | Lewicki | 64/2 R |
| 3,855,817 | 12/1974 | Stuemky et al. | 64/2 |

FOREIGN PATENTS OR APPLICATIONS

| | | | |
|---|---|---|---|
| 553,770 | 5/1923 | France | 64/2 R |

*Primary Examiner*—Samuel Scott
*Assistant Examiner*—Randall Heald
*Attorney, Agent, or Firm*—Cushman, Darby & Cushman

[57] ABSTRACT

A flexible shaft for transmitting torque, comprising a flexible hose, inside which there is provided, between two mutually separate torque-transmitting means for input and output of torque, a flexible core lying in contact with the inner circumference of the hose at several places. A shaft of this type is included in the torsion-stiff connection between the steering wheel and steering gear on a vehicle.

15 Claims, 8 Drawing Figures

U.S. Patent  March 2, 1976  Sheet 1 of 3  3,940,945
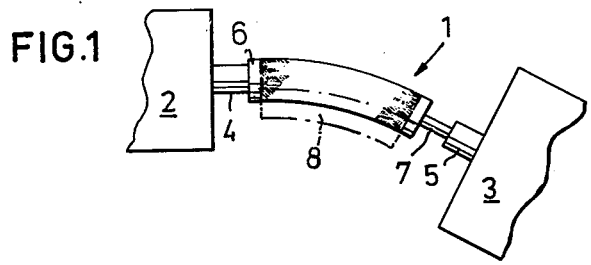
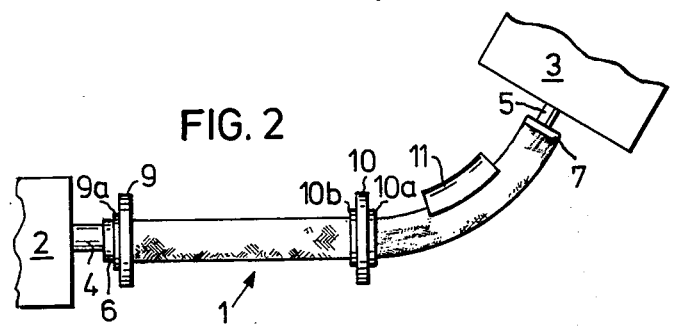
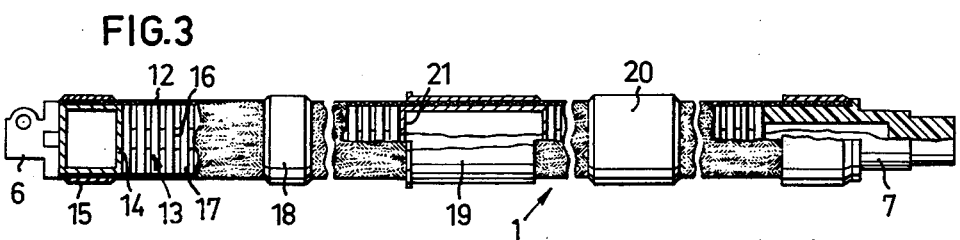
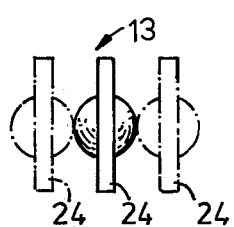
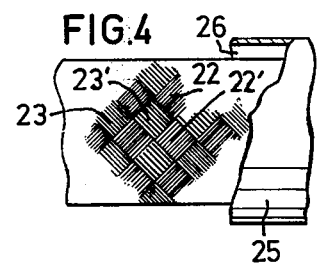
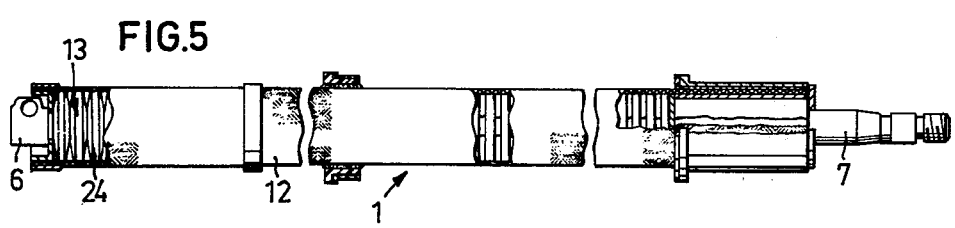

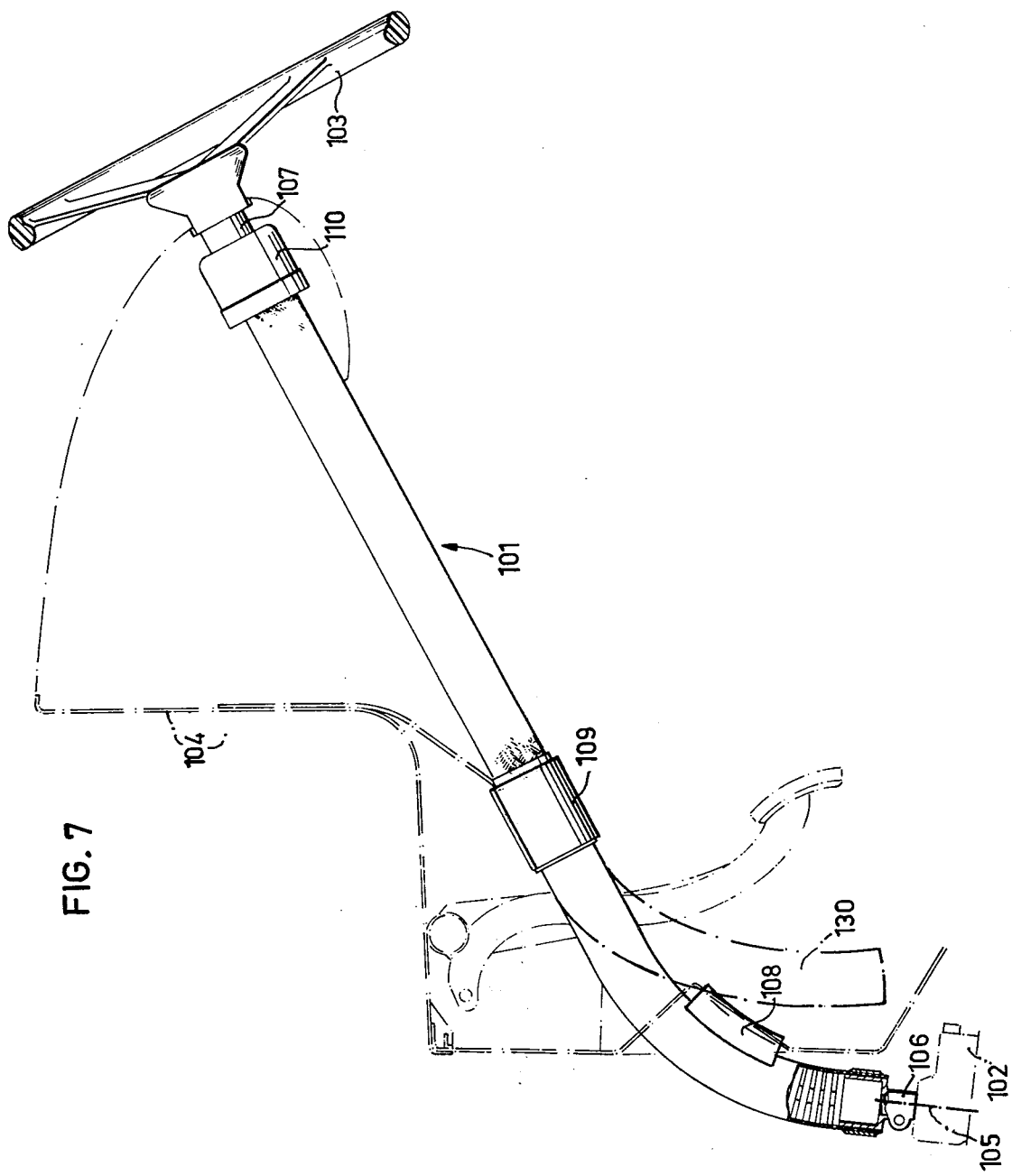

FLEXIBLE SHAFT

The present invention relates to a flexible shaft for transmitting torque.

Various different kinds of flexible shafts are previously known. One kind, for example, comprises a close-lapped helical spring while another kind comprises a conbination of a helical spring inside which a rotatable wire is arranged. A further kind comprises a tube having circumferential, adjacent folds. What is common for these and other similar kinds of flexible shafts is that it is difficult to unite great torque-transmitting ability with great flexibility. The shaft becomes either fairly rigid and has great torque-transmitting ability or it becomes weak and has only slight torque-transmitting ability.

In terms of driver-protection in vehicles, it is desirable to form the steering arrangement in such a way that the driver runs little or no risk of being injured by the steering wheel or steering column when the vehicle is subjected to a collision or the like. Normally, a straight non-flexible steering column is used which is telescopical and, if desired, provided with a deformable, energy absorbing member near the steering wheel. It is also common that rigid steering columns are mounted with deformable fasteners. Another solution, known by U.S. Pat. specification No. 3,548,675 and German Pat. specification No. 1 935 746, is to construct a portion of the steering arrangement near the steering gear in the form of a flexible, torque-transmitting shaft for the purpose of being able to purposely change the steering column inclination upon entering or getting out of the vehicle or in the event of a collision. In the firstmentioned specification it is not disclosed in detail how the flexible shaft is to be designed, whereas, in the second specification, it is disclosed that the shaft in question comprises wire cables which, via a universal link, are connected to the steering gear. One of the disadvantages with this and other constructions is that the flexible shaft can only be given a limited length so as not to jeopardize steering accuracy to too great an extent and, further, a significant portion of the steering column is inflexible and thus, despite all precautions, still constitutes a potential danger to the driver. Known torsion-stiff shafts have been all too inflexible while, on the other hand, sufficiently flexible shafts have not been sufficiently torsion-stiff other than in short connections and, thus, flexible shafts have, so far, not been used so extensively in steering arrangements in vehicles.

The purpose of this invention is to obtain a flexible shaft which, better than previously known kinds of flexible shafts, unites great torsion stiffness and good flexibility. Another purpose is to hereby obtain a simplified steering arrangement for vehicles.

A flexible shaft is obtained according to the invention by means of a tubular, flexible hose being provided with two, in the longitudinal direction of the hose separated torque-transmitting means for transmitting torque respectively to and from the hose and, further, at least one flexible core being arranged inside the hose between said mutually separated torque-transmitting means, said core lying in contact with the inner circumference of the hose at several places along the same so that the hose and the core from a flexible and torsion-stiff torque-transmitting element.

In one suitable embodiment according to the invention, the hose comprises a braided tube, preferably cross-lapped, whereby it is possible to achieve great torque-transmitting ability in both torsional directions with a relatively thin and pliable hose.

According to a further suitable embodiment, the core comprises a flexible rod provided with a plurality of radial flanges. An increased flexibility is obtained when the core is composed of a plurality of separate, adjacently placed elements and it is also possible to combine a flexible rod and separate elements in suitable proportions.

A simplified steering arrangement for vehicles is obtained by allowing the flexible shaft constructed in the manner disclosed above to be included in the torsion-stiff connection between the steering wheel and the steering gear.

These and other details and advantages which are characteristic of the invention are explained in more detail with reference to the examples shown in the enclosed drawings in which:

FIG. 1 schematically illustrates a possible use of a flexible shaft according to the invention, FIG. 2 schematically illustrates another possible use of said shaft, FIG. 3 is a side view, partially in section, of a flexible shaft according to the invention, FIG. 4 is a detail of the hose, FIG. 5 shows another embodiment of the flexible shaft, FIG. 6 is a side-view of separate core elements, FIG. 7 schematically illustrates a flexible shaft according to the invention in its position in a steering arrangement for vehicles and FIG. 8 shows the shaft according to FIG. 7 in a partially deformed state.

FIG. 1 shows how a flexible shaft 1 according to the invention is used in order to transmit torque between two arrangements 2 and 3, respectively, the respective shafts 4 and 5 of which form a certain angle to each other. Both ends of the flexible shaft 1 are provided with a torque-transmitting means 6 and 7 respectively which are connectable to the shafts 4 and 5, respectively and which transfer torque to and from the flexible shaft 1. The torque-transmitting means 6 and 7 suitably have tension transmitting attachment to the shafts 4 and 5. The arrangements 2 and 3 can be stationarily mounted or have a certain mutual freedom of movement. When the arrangements are stationarily mounted, the shaft 1 can be guided by a support 8 which is illustrated by the striped lines, said support 8 being channel-like or providing in another way guidance in a radial direction.

According to FIG. 2, torque is transmitted between the arrangements 2 and 3 with the help of a flexible shaft 1 which is supported by supports 9,10 and 11, wherein the support 11 is constructed in essentially the same manner as the support 8 in FIG. 1. The torque-transmitting means 6 is movable on the shaft 4, while the torque-transmitting means 7 has a tension transmitting attachment to the shaft 5. In order to take up the tensional load in the flexible shaft 1 when torque is transmitted, the shaft 1 is provided with stationary supports 9a, 10a and 10b which bear against the supports 9 and 10, respectively. The portion of the shaft 1 which is situated between the supports 9 and 10 is relieved of tension by means of the supports 9 and 10 being held apart or being stationary while the shaft 1 is mounted with a certain prestressing. The stationary support 10b, together with support 10, relieves the remaining portion of the shaft 1. It is also possible to couple together two or more flexible shafts via intermediary conventional rigid shafts which can be stationary or movable. The amount and type of supporting elements is adjusted according to need.

Common for these different connections is that angular joints (for example with gears), universal joints and other commonly used arrangements for transmitting torque between mutually angled shafts becomes unnecessary. This provides great advantages in terms of both assembly and cost.

In the embodiment of a flexible shaft 1 according to the invention which is shown in FIG. 3, a tubular, flexible hose 12 is provided at both ends with torque-transmitting means 6 and 7, respectively, which are attached to the hose for transmitting torque to and from the hose, respectively. A flexible core 13 is arranged between the torque-transmitting means 6 and 7 inside the hose 12, said core 13 lying in contact with the inner circumference of the hose 12 at several places along the same. The hose and the core form a flexible, torsion-stiff torque-transmitting means.

The torque-transmitting means 6 has a portion 14 which projects into the hose 12 and is fastened to the inside of the same. The end portion of the hose 12 is contained between said portion 14 and a casing shaped part 15 which is placed on the outside of the hose 12 and fastened to the torque-transmitting means 6. The torque-transmitting means 6 can be designed for several different types of connection to the arrangements from or to which the torque shall be transmitted and can, for example, be provided with inner or outer splines or the like, but can also be designed for friction locking. Torque-transmitting means 7 has a corresponding construction.

The core 13 comprises a flexible rod 16 which is provided with a number of mutually separate, radial flanges 17 which hold the hose 12 stretched. Three support means 18,19,20 are fastened on the outside of the hose 12 between the torque-transmitting means 6 and 7, said support means being intended to guide the shaft in supports when the shaft is of great length or is mounted with one or more great bends. The hose 12 is inwardly provided with a brace 21 at the middle support means 19, said brace dividing the core 13 in two parts.

A braided tube is most advantageously used as a hose and can have the cross-lapped form shown in FIG. 4. Portions 22,22' etc. form angles and are braided together with portions 23,23' etc. Each such portion can be constructed in a unit in the form of band or wire or can, as shown here, comprise a plurality of separate band or wire-shaped members which, in turn, can be constructed in a various number of ways. The construction is in each separate case, adapted to those demands which are placed on flexibility and torque-transmitting capability.

The embodiment shown in FIG. 5 essentially differs from the one shown in FIG. 3 in that at least a portion of the core 13 has another construction. The end of the core 13 which is situated closest to the torque-transmitting means 6. comprises a number of separate, closely spaced elements 24 which are essentially disc-shaped and have greater axial extension at their centre than at their periphery. An expedient construction can be alternatively obtained by cutting into sections the rod 16 in FIG. 3 between the flanges 17. It is essential that the portions of the flanges 17 or the separate elements 24 which are in contact with the inner circumference of the hose are not all too distant from each other axially as, otherwise, the risk arises that the hose 12 deforms in an undesirable manner between these contact points. An embodiment of a separate core-member according to FIG. 6 and which has in section a spherical portion has, in terms of friction, been shown to be advantageous.

The material in the hose and torque-transmitting means is most suitably steel but even other metals, plastics etc. are conceivable. The support means and the core can be constructed of metal or plastics. Parts of metal, for example, the hose and torque-transmitting means can, for example, be welded, soldered or glued together, while plastics parts or plastics and metal parts can, for example, be glued together. The torque-transmitting means can also serve as support means and it is also possible to place one or a plurality of such torque-transmitting means between those torque-transmitting means which are placed at the ends of the hose, the former torque-transmitting means being attached totally on the outside of the hose. It is also possible to join together two hoses of differing construction to a common shaft with or without torque-transmitting ability at the joining point.

The hose 12 can be outwardly provided with a protective hose 25, see FIG. 4, which can enclose the hose 12 tightly or be so much larger than said hose 12 that a ring-shaped gap 26 is formed between the hose 12 and the protective hose. The gap 26 can, for example, contain lubricants which keep the hose 12 in good condition.

A possible use for a shaft according to the invention is shown in FIG. 7, where a flexible shaft 101 to the steering arrangement in a vehicle is included in the torsion-stiff connection between the steering gear 102 and the steering wheel 103 in a vehicle 104. The driven axle 105 on the steering gear 102 forms, here, a certain angle to the turning axis of the steering wheel 103. In the end which is turned towards the steering gear 102, the shaft 101 is provided with a torque-transmitting means 106 which is attachable to the driven axle 105 of the steering gear 102, and the opposite end of the shaft 101 is provided with a torque-transmitting means 107 which is attachable to the steering wheel 103. The two torque-transmitting means 106 and 107 transfer torque from and to, respectively, the shaft 101. The shaft 101 is mounted in a number of supports 108,109 and 110 between the steering gear 102 and the steering wheel 103, said supports being attached to the vehicle 104 and constituting guides for the shaft 101 and are arranged to absorb tension loads arising in the shaft 101 when transmitting torque. As can be seen in FIG. 7, the shaft 101 is held straight between the supports 109 and 110 while, between the support 109 and the steering gear, it is fairly strongly bent and, in the bend or curve, is guided by the support 108. The steering column, that is, the shaft 101 can also be mounted with pretension between the stationary supports. That portion of support 108 which supports the shaft 101 suitably has the shape of a bent groove.

The striped lines 130 in FIG. 7 schematically illustrate what happens to the flexible shaft 101 when the steering gear 102, in a head-on collision for the vehicle 104, is displaced in a direction towards the driver (not shown). The shaft 101 is bent without the steering wheel being moved and injuring the driver. Suitably at least the support 108 is so mounted that the deformation of the shaft 101 is made easier.

In FIG. 8, it is shown how the flexible shaft 101 can be deformed according to 131 when the driver is thrown against the steering wheel. The deformation forms shown in FIGS. 7 and 8 only constitute examples which show how a steering arrangement is obtained which, in terms of safety, is advantageous and which also show how a simplified installation without universal joints or the like is possible. A steering arrangement of this type can of course be constructed in several other ways which are adapted to the vehicle in question.

What we claim is:

1. A flexible and torsion-stiff torque transmitting shaft comprising
   a. means for transmitting torque from a first torque-transmitting member to a second torque-transmitting member spaced from the first torque-transmitting member along a longitudinal direction, said means comprising a flexible hose disposed generally along said longitudinal direction and operatively connected at its ends to the first and second members, and
   b. means for supporting said flexible hose from the interior thereof to prevent play between the first and second torque-transmitting members, said means including a flexible core making contact with and supporting said hose at several places along the length thereof.

2. A shaft according to claim 1, characterized in that the hose comprises a braided hose, preferably cross-lapped.

3. A shaft according to claim 1, characterized in that the core comprises a flexible rod provided with a number of radial flanges.

4. A shaft according to claim 1, characterized in that said shaft is arranged to be fastened between stationary tension-absorbing means.

5. A shaft according to claim 1, characterized in that a protective hose is arranged on the outside of the hose.

6. A flexible and torsion-stiff torque-transmitting shaft for a steering arrangement in a vehicle having a steering wheel and steering gear, said shaft comprising
   a. means for transmitting torque from the steering wheel to the steering gear, said means comprising a flexible hose disposed generally along a longitudinal direction and operatively connected at its ends to the steering wheel and the steering gear respectively, and
   b. means for supporting said flexible hose from the interior thereof to prevent play between the steering wheel and the steering gear, said means including a flexible core making contact with and supporting said hose at several places along the length thereof.

7. A flexible and torsion-stiff torque transmitting shaft comprising
   a. means for transmitting torque from a first torque-transmitting member to a second torque-transmitting member spaced from the first torque-transmitting member along a longitudinal direction, said means comprising a flexible hose disposed generally along said longitudinal direction and operatively connected at its ends to the first and second members, and
   b. means for supporting said flexible hose from the interior thereof to prevent play between the first and second torque-transmitting members, said means including a flexible core making contact with and supporting said hose at several places along the length thereof, wherein the core comprises a number of separate, closely-spaced elements.

8. A shaft according to claim 7, characterized in that the separate elements are essentially disc-shaped and have greater axial extension at their centre than at their periphery.

9. A shaft according to claim 7, characterized in that the separate elements have a spherical middle section.

10. A shaft according to claim 9, characterized in that inside the hose a support for the bearing means is arranged at the bearing means.

11. A flexible and torsion-stiff torque-transmitting shaft comprising
    a. means for transmitting torque from a first torque-transmitting member to a second torque-transmitting member spaced from the first torque-transmitting member along a longitudinal direction, said means comprising a flexible hose disposed generally along said longitudinal direction and operatively connected at its ends to the first and second members, and
    b. means for supporting said flexible hose from the interior thereof to prevent play between the first and second torque-transmitting members, said means including a flexible core making contact with and supporting said hose at several places along the length thereof, wherein the core comprises partly a flexible rod provided with a number of radial flanges and partly a number of separate, closely spaced elements.

12. A shaft according to claim 11, characterized in that the separate elements are essentially disc-shaped and have greater axial extension at their center than at their periphery.

13. A shaft according to claim 11 characterized in that the separate elements have a spherical middle section.

14. A flexible and torsion-stiff torque transmitting shaft comprising
    a. means for transmitting torque from a first torque-transmitting member to a second torque-transmitting member spaced from the first torque-transmitting member along a longitudinal direction, said means comprising a flexible hose disposed generally along said longitudinal direction and operatively connected at its ends to the first and second members, and
    b. means for supporting said flexible hose from the interior thereof to prevent play between the first and second torque-transmitting members, said means including a flexible core making contact with and supporting said hose at several places along the length thereof, wherein said hose is outwardly provided with a bearing means between the mutually separated torque-transmitting means for the purpose of guiding the shaft.

15. A flexible and torsion-stiff torque transmitting shaft comprising
    a. means for transmitting torque from a first torque-transmitting member to a second torque-transmitting member spaced from the first torque-transmitting member along a longitudinal direction, said means comprising a flexible hose disposed generally along said longitudinal direction and operatively connected at its ends to the first and second members, and
b. means for supporting said flexible hose from the interior thereof to prevent play between the first and second torque-transmitting members, said means including a flexible core making contact with and supporting said hose at several places along the length thereof, wherein said shaft is arranged to be supported by a bent groove or corresponding guide means when the shaft is strongly bent, that is when the bending radius of the shaft is small.

* * * * *